US006357119B1

(12) United States Patent
Acerra

(10) Patent No.: US 6,357,119 B1
(45) Date of Patent: Mar. 19, 2002

(54) TUBE CUTTER/CLEANER ATTACHMENT

(75) Inventor: John T. Acerra, Miami, FL (US)

(73) Assignee: Ace Mechanical Technologies, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/307,669

(22) Filed: May 10, 1999

Related U.S. Application Data

(63) Continuation-in-part of application No. 09/022,790, filed on Feb. 12, 1998.

(51) Int. Cl.[7] ................................................ B23D 21/06

(52) U.S. Cl. ............................... 30/102; 30/123; 30/92; 15/157; 15/104.04

(58) Field of Search ............................ 30/92, 102, 173, 30/93; 7/107, 157, 158; 451/461, 462, 555, 558; 15/104.04, 229.12, 229.13, 246, 104.03

(56) References Cited

U.S. PATENT DOCUMENTS

| | | | | | |
|---|---|---|---|---|---|
| 300,898 | A | * | 6/1884 | Robbins | 30/102 |
| 440,017 | A | * | 11/1890 | Comstock | 7/157 |
| 2,130,934 | A | * | 9/1938 | Thewes | 30/102 |
| 2,147,032 | A | * | 2/1939 | Haury | 401/1 |
| 2,325,353 | A | * | 7/1943 | Wright | 30/102 |
| 2,563,483 | A | * | 8/1951 | O'Hagan | 15/104.04 |
| 3,240,088 | A | * | 3/1966 | Samuels et al. | 30/102 |
| 3,355,749 | A | * | 12/1967 | Steffen | 7/157 |
| 3,432,871 | A | * | 3/1969 | Caprioli | 15/104.04 |
| 3,545,081 | A | * | 12/1970 | Butler | 30/123 |
| 3,672,050 | A | * | 6/1972 | Hanbeck | 30/99 |
| 3,885,261 | A | * | 5/1975 | Skvarenina | 7/14.1 |
| 5,168,660 | A | * | 12/1992 | Smith | 51/181 |
| 5,295,278 | A | * | 3/1994 | Condon et al. | 15/104.04 |
| 5,349,751 | A | * | 9/1994 | Fahr | 30/102 |
| 5,647,803 | A | * | 7/1997 | Killer | 470/67 |
| 5,829,142 | A | * | 11/1998 | Rieser | 30/93 |

* cited by examiner

*Primary Examiner*—M. Rachuba
*Assistant Examiner*—Kim Ngoc Tran
(74) *Attorney, Agent, or Firm*—Malin, Haley & DiMaggio, P.A.

(57) ABSTRACT

A tubing/pipe cleaning attachment is provided which can be attached to a conventional tubing cutter. The cleaning attachment can be pivotally affixed to the tubing cutter and cleans round pipe or tubing while such tubing or pipe is being cut by the cutter, and thus, within a single operation. The cleaning attachment preferably comprises a substantially V-shaped body member to which an abrasive pad member is attached. The cleaner attachment cleans the pipe when attached to the tubing cutter when it is rotated about the tubing by the abrasive pad member.

25 Claims, 2 Drawing Sheets

TUBE CUTTER/CLEANER ATTACHMENT

CROSS-REFERENCE TO RELATED APPLICATIONS

This is a continuation-in-part of application Ser. No. 09/022,790, filed Feb. 12, 1998.

STATEMENT REGARDING FEDERALLY SPONSORED RESEARCH OR DEVELOPMENT

Not Applicable.

BACKGROUND OF THE INVENTION

1. Field of the Invention

The present invention relates generally to tube cleaners, and more particularly, to a cleaning attachment which is attached to a tube cutter.

2. Description of Related Art

Plumbers commonly cut pieces of tube pipe, often constructed from copper, to smaller sizes needed for a particular job. Typically conventional pipe or tube cutters are used for the cutting job. Once the copper pipe is cut, the ends of the pipe must be cleaned so that the pipe can be soldered to an appropriate connector. To clean the ends of the pipe the plumber or his or her assistant uses steel wool, emmery cloth, sand cloth material, etc., to remove any dirt or grime or other unwanted substances on the end of the pipe. This process though usually successful, requires time and labor, to properly cut and clean the copper pipe. It is therefore, to the effective resolution of the aforementioned problems and shortcomings that the present invention is directed.

BRIEF SUMMARY OF THE INVENTION

The present invention provides a tube or pipe cleaner which is preferably attached to a conventional tube or pipe cutter ("cutter"). The cleaner is provided with a body member preferably having a first attachment surface and a second attachment surface which meet or are constructed integral at respective first ends to define a substantially V-shaped notch or intersection. The angle of the notch is preferably approximately ninety (90°) degrees to allow the notch to lock the pipe or tubing while it is being cut and cleaned. Other angles which will sufficiently lock the pipe or tubing, to prevent thread cutting, such as, but not limited to approximately eighty to one hundred degrees, can also be used for the notch angle and are considered within the scope of the invention.

A cleaning material such as an abrasive pad, emmery cloth, sand cloth, or even steel wool or other abrasive materials, are attached to the first and second attachment surfaces of the body member. The cleaning material can either be permanently or removably attached to the attachment surfaces, by many conventional means, such as adhesives and glues, stitching, staples, hook and loop fasteners, etc. Preferably, the cleaning material can cover a substantial portion of or the entire outer surfaces of the first and second attachment surfaces of the body member.

The body member is preferably provided with two flange members. Each flange member can have at least one aperture extending therethrough. The body member is preferably pivotally attached to the cutter. However, the body member can also be nonpivotally attached and in this alternative embodiment, two apertures are preferably provided on each flange member.

To pivotally attach the body member to the cutter, the conventional screw for the outer roller of the cutter is removed, and the aperture of each flange member are aligned with the aperture of the roller. A screw or nut/bolt is inserted in the apertures to pivotally attach the body member to the cutter. As an alternative to a screw or nut/bolt combination, a locking pin or other conventional devices can be used and are all considered within the scope of the invention. Where the body member is nonpivotally attached, the conventional screw for the inner roller is removed, and the second apertures, of the flanges, are aligned with the inner roller aperture and a second chosen locking device, such as a screw and nut cap, is inserted in the apertures to provide a second attachment point of the flanges to the cutter.

Accordingly, it is an object of the present invention to provide a new alternative to the old methods of cutting and cleaning pipe/tubing.

It is another object of the present invention to allow for cleaning of the pipe/tubing while it is being cut.

It is yet another object of the present invention to reduce the time and labor required to clean and cut a pipe or tubing, such as copper pipe or tubing.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which.

DESCRIPTION OF THE PREFERRED EMBODIMENTS

Figure 1:
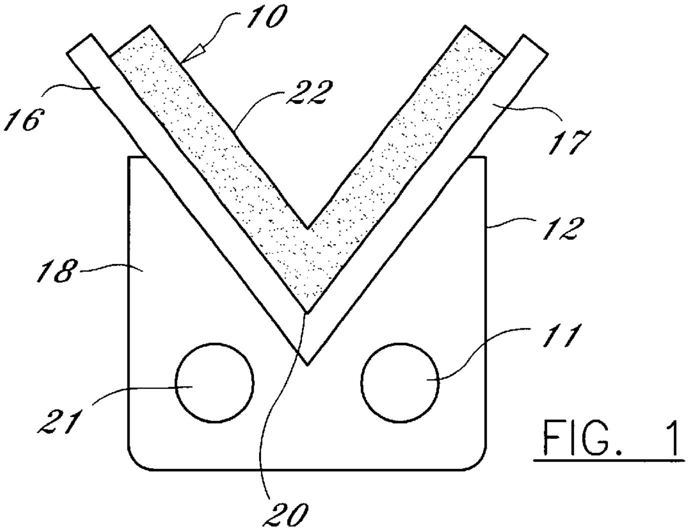
FIG. 1 is a side elevational view illustrating one embodiment of the present invention.
Figure 2:
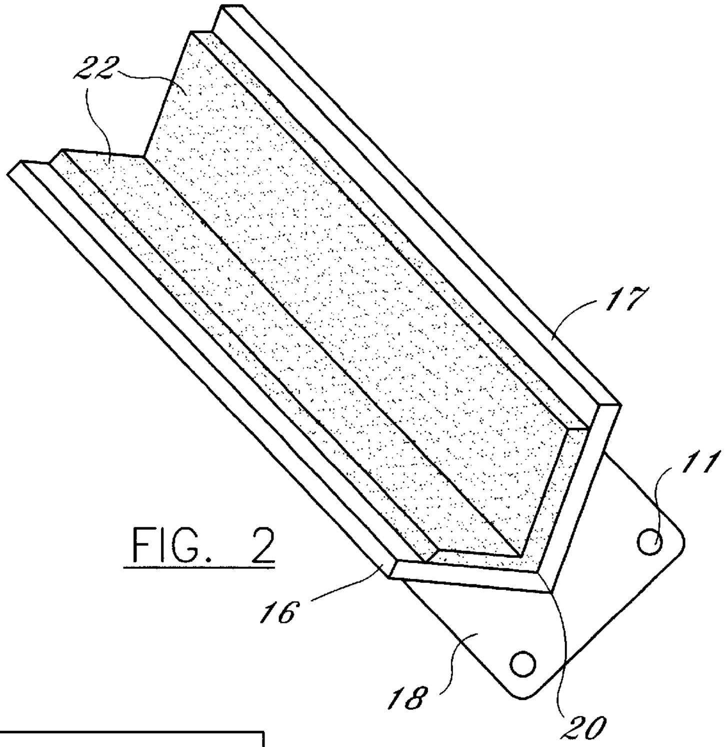
FIG. 2 is a perspective view of the invention shown in FIG. 1.
Figure 3:
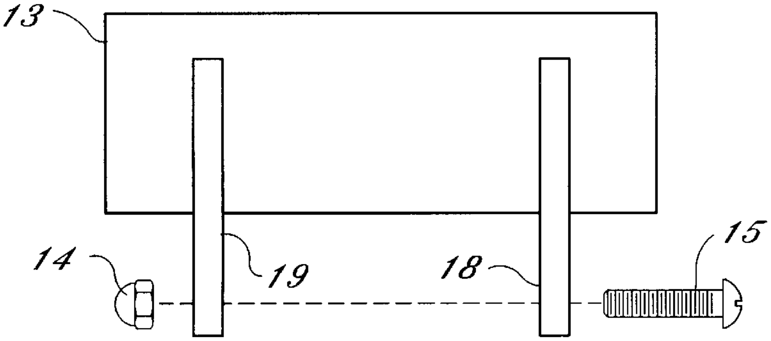
FIG. 3 is a front elevational view of the invention shown in FIG. 1.

As see in the figures a tube or pipe cleaner 10 is shown and preferably attached to a conventional tube or pipe cutter 100 ("cutter"). Cleaner 10 is provided with a body member 12 preferably having a first attachment surface 16 and a second attachment surface 17 which meet or are constructed integral at respective first ends to define a substantially V-shaped notch or intersection 20. The angle of notch 20 is preferably approximately ninety (90°) degrees to allow notch 20 to lock the pipe or tubing to be cut (not shown) while it is being cut and cleaned. Other angles which will sufficiently lock the pipe or tubing, to prevent thread cutting, can also be used for the angle of notch 20 and are considered within the scope of the invention. As best seen in FIG. 2, whether integral or separate, the first end of first attachment surface 16 and the first end of the second attachment surface 17 continuously abut from a first side of body member 12 to a second side of body member 12.

A cleaning material 22 such as an abrasive pad, emmery cloth, sand cloth, or even steel wool other abrasive materials (all collectively referred to for purposes of the disclosure and claims), are attached to first and second attachment surfaces 16 and 17, respectively, of the body member 12 by conventional means. Cleaning material 22 can either be permanently or removably attached to attachment surfaces 16 and 17, by many conventional means, such as adhesives and glues, stitching, staples, hook and loop fasteners, etc. Preferably, cleaning material 22 can cover a substantial portion of or the entire outer surfaces of first and second attachment surfaces 16 and 17 of body member 12. Cleaning material 22 can either be a single piece attached to both surfaces 16 and 17 or can be two separate pieces one attached and/or associated with surface 16 and one attached and/or associated with surface 17.

Body member 12 is preferably provided with two flange members 18 and 19. Each flange member 18 and 19 can have at least one aperture 21 extending therethrough. Body member 12 is preferably pivotally attached to cutter 100. However, body member 12 can also be non-pivotally attached and in this alternative embodiment, two apertures 11 and 21 are preferably provided on each flange member 18 and 19. The spacing between flanges 18 and 19 can vary depending on the tubing/pipe cutter to which cleaning device will be attached to.

To pivotally attach body member 12 to cutter 100, the conventional screw for the outer roller 102 of cutter 100 is removed, and aperture 21 of each flange member 18 and 19 are aligned with the aperture of roller 102. A screw or bolt 15 is inserted in the apertures, and maintained by a nut or cap 14, to pivotally attach body member 12 to cutter 100. As an alternative to a screw or nut/bolt combination, a locking pin or other conventional devices can be used and are all considered within the scope of the invention. All of the these attachment devices will be collectively referred to as "locking member" for purposes of the disclosure and claims. Where body member 12 is non-pivotally attached, the conventional screw for the inner roller 104 is also removed, and the second apertures 11, of flanges 18 and 19, are aligned with the inner roller aperture and a second locking member is inserted in the apertures to provide a second attachment point of flanges 18 and 19 to cutter 100.

Cleaning material 22, when the pipe or tubing rotates within notch 20, cleans and shines the pipe or tubing. Cleaner 10 cleans the inserted piece of pipe or tubing at both sides of the cutting wheel 106 of cutter 100, and far enough to receive a fitting, preparing it for soldering, brazing or silver solder.

Body member 12 can be manufactures from many different conventional materials such as plastic, nylon, metal, wood, etc., and its use is not limited to any one specific type of cutter. Cleaner 10, when attached to cutter 100, cleans the pipe or tubing while it rotated by the abrasive pad or cleaning member 22. Once the pipe or tubing is locked, cutter 100 is rotated around the pipe, as conventionally known, thus, also causing cleaner 10 to be rotated around the pipe, opposite cutting wheel 106, and cleaning the pipe or tubing as it is being cut.

Figure 4:
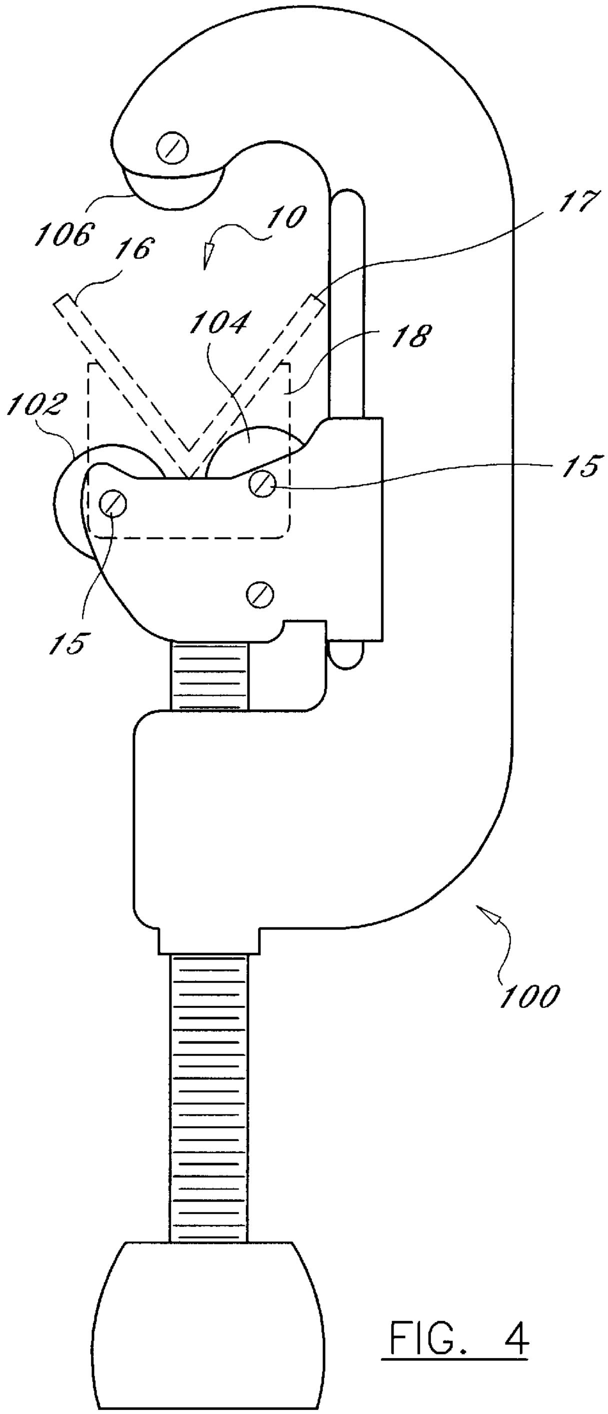
FIG. 4 is a side elevational view of a conventional tubing cutter showing the present invention (in phantom) affixed thereto, and also displaying the operable position of the present invention with respect to the cutter.
Figure 5:
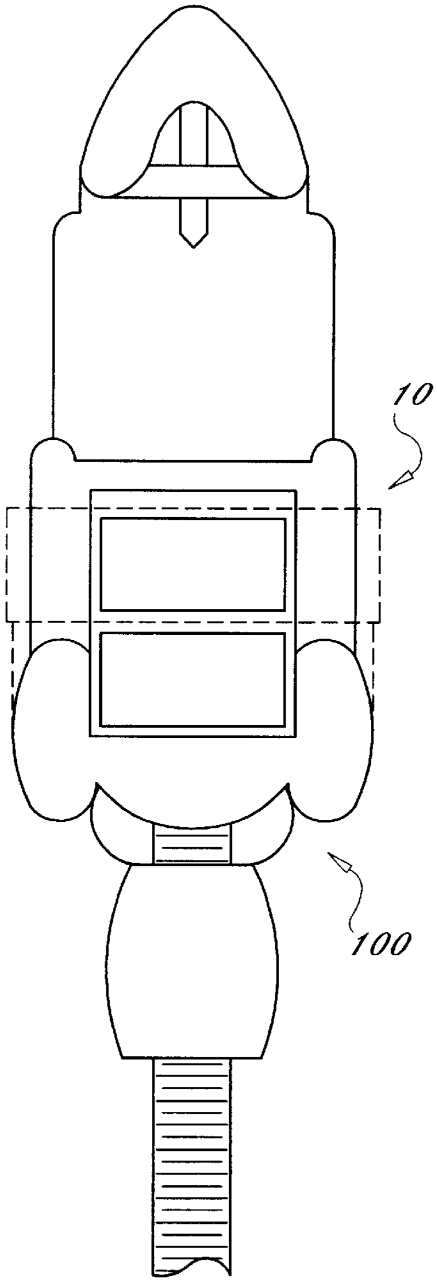
FIG. 5 is a front elevational view of a conventional tubing cutter showing the present invention (in phantom) affixed thereto, and also displaying the operable position of the present invention with respect to the cutter.

With one locking member 15 placed through apertures 20 and the front roller aperture, cleaner 10 is allowed to pivot back and forth. With slight pressure from a user, cleaner 10 can be rotated forward, to allow cutter 10 to be used conventional without any cleaning capabilities. The pivotability of cleaner 10, also allows body member 12 to be pivoted forward to receive or load larger pipe or tubing, that would otherwise be restricted, by placing the pipe or tubing within notch 20 and pivoting back body member 12 into its cutting and cleaning position (FIGS. 4 and 5).

Cleaner 10, by trapping the pipe or tubing within notch 20, cleans at two points (i.e. surfaces 16 and 17, in conjunction with cleaning material 22). As best seen in FIG. 5, the body member 12 extends beyond each side of cutter 100, to provide a long or deep enough cleaning for the pipe or tubing. Additionally, cleaner 10 can also be permanently attached to cutter 100, if desired, by conventional means.

The angle of V-notch 20 also serves as a retaining device, after the tubing or pipe is cut, to prevent the certain cut tube or pipe from falling to the ground and possibly becoming contaminated or otherwise dirty or damaged. Body member 12 including attachment surfaces 16 and 17 and flanges 18 and 19 can be molded or otherwise constructed integral as a one piece unit. Alternatively, attachment surfaces 16 and/or 17 and/or flanges 18 and/or 19 can be separate pieces attached together.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tubing/pipe cleaning device, said device attachable to a tubing/pipe cutter, said cutter having a cutting blade and at least one roller, said cutter defining a receiving area between said cutting blade and said at least one roller, said tubing/pipe cleaning device comprising:

a body member having a first attachment surface and a second attachment surface which form a substantially V-shaped cleaning area, said body member adapted for attachment to the tubing cutter within the receiving area of the cutter and over the at least one roller and opposite the cutting blade of the cutter; and an abrasive material attached to said body member such that said abrasive material covers a substantial portion of said first attachment surface and said second attachment surface;

wherein said body member further including a first flange member and a second flange member depending downward from said first and second attachment surfaces, wherein said first flange member provided with a first aperture and said second flange member provided with a second aperture; wherein said first and second apertures are adapted for alignment with a roller aperture of said tubing cutter to allow a locking member to be inserted through said first and second apertures and the roller aperture for pivotable attachment of said body member to the tubing cutter from a first tube/pipe receiving position to a tube/pipe cutting position.

2. A tubing/pipe cleaning device, said device attachable to a tubing/pipe cutter, said cutter having a cutting blade and at least one roller, said cutter defining a receiving area between said cutting blade and said at least one roller, said tubing/pipe cleaning device comprising:

a body member having a first attachment surface and a second attachment surface which form a substantially V-shaped cleaning area, said body member adapted for attachment to the tubing cutter within the receiving area of the cutter and over the at least one roller and opposite the cutting blade of the cutter; and an abrasive material attached to said body member such that said abrasive material covers a substantial portion of said first attachment surface and said second attachment surface;

wherein said body member is pivotally attached to the tubing cutter from a first tube/pipe receiving position to a tube/pipe cutting position.

3. A tubing/pipe cleaning device, said device attachable to a tubing/pipe cutter, said cutter having a cutting blade and at least one roller, said cutter defining a receiving area between said cutting blade and said at least one roller, said at least one roller having a roller aperture, said tubing/pipe cleaning device comprising:

a body member having a first attachment surface and a second attachment surface which form a substantially V-shaped cleaning area, said body member also including a first flange member and a second flange member depending downward from said first and second attachment surfaces, wherein said first flange member provided with a first aperture and said second flange member provided with a second aperture, wherein said first and second apertures are adapted for alignment with the roller aperture of said tubing cutter to allow a locking member to be inserted through said first and second apertures and the roller aperture for pivotable attachment of said body member to the tubing cutter within the receiving area of the cutter and over the at least one roller and opposite the cutting blade of the cutter; and an abrasive material attached to said body member such that said abrasive material covers a substantial portion of said first attachment surface and said second attachment surface;

wherein said body member is pivotable with respect to the cutter from a first tube/pipe receiving position to a tube/pipe cutting position.

4. The tubing/pipe cleaning device of claim 3 wherein said first and second attachment surfaces are constructed integral and define an angle of approximately eighty (80°) to one hundred (100°) degrees, wherein said angle allowing said first and second attachment surfaces in conjunction with said abrasive material to retain said tube or pipe once cut within the cleaning area.

5. The tubing/pipe cleaning device of claim 4 wherein the angle is approximately ninety (90°) degrees.

6. The tubing/pipe cleaning device of claim 3 wherein said first attachment surface having a first end and said second attachment surface having a first end and said first end of said first attachment surface and said first end of said second attachment surface abut to define an angle of approximately eighty (80°) to one hundred (100°) degrees, wherein said angle allowing said first and second attachment surfaces in conjunction with said abrasive material to retain said tube or pipe once cut within the cleaning area.

7. The tubing/pipe cleaning device of claim 6 wherein the angle is approximately ninety (90°) degrees.

8. The tubing/pipe cleaning device of claim 6 wherein the first end of said first attachment surface and the first end of said second attachment surface continuously abut each other along a length of the body member.

9. The tubing/pipe cleaning device of claim 3 wherein said first and second attachment surfaces in conjunction with said abrasive material retain the tubing or pipe within the cleaning area once cut.

10. The tubing/pipe cleaning device of claim 3 wherein the attachment of said abrasive material to said body member defines two independent cleaning points.

11. A tubing/pipe cleaning device, said device attachable to a tubing/pipe cutter, said cutter having a cutting blade and at least one roller, said cutter defining a receiving area between said cutting blade and said at least one roller, said at least one roller having a roller aperture, said tubing/pipe cleaning device comprising:

a body member having a first attachment surface and a second attachment surface which form a substantially V-shaped cleaning area, said body member also including a first flange member and a second flange member depending downward from said first and second attachment surfaces, wherein said first flange member provided with a first aperture and said second flange member provided with a second aperture, wherein said first and second apertures are adapted for alignment with the roller aperture of said tubing cutter to allow a locking member to be inserted through said first and second apertures and the roller aperture for pivotable attachment of said body member to the tubing cutter within the receiving area of the cutter and over the at least one roller and opposite the cutting blade of the cutter; and an abrasive material attached to said body member such that said abrasive material covers a substantial portion of said first attachment surface and said second attachment surface;

wherein said body member is pivotable with respect to the cutter from a first tube/pipe receiving position to a tube/pipe cutting position.

12. The tubing/pipe cleaning device of claim 11 wherein said first and second attachment surfaces are constructed integral and define an angle of approximately eighty (80°) to one hundred (100°) degrees, wherein said angle allowing said first and second attachment surfaces in conjunction with said abrasive material to retain said tube or pipe once cut within the cleaning area.

13. The tubing/pipe cleaning device of claim 12 wherein the angle is approximately ninety (90°) degrees.

14. The tubing/pipe cleaning device of claim 11 wherein a first end of said first attachment surface and a first end of said second attachment surface continuously abut each other along a length of the body member.

15. The tubing/pipe cleaning device of claim 11 wherein said first and second attachment surfaces in conjunction with said abrasive material retain the tubing or pipe within the cleaning area once cut.

16. The tubing/pipe cleaning device of claim 11 wherein the attachment of said abrasive material to said body member defines two independent cleaning points.

17. A cleaning device for preparing tubing/pipe for soldering, said device attachable to a tubing/pipe cutter, said cutter having a cutting blade and at least one roller, said cutter defining a receiving area between said cutting blade and said at least one roller, said tubing/pipe cleaning device comprising:

a body member having a first attachment surface and a second attachment surface which form a substantially V-shaped cleaning area, said body member adapted for attachment to the tubing cutter within the receiving area of the cutter and over the at least one roller and opposite the cutting blade of the cutter, said body member adapted for attachment to the tubing cutter such that the at least one roller is inoperable; and an abrasive material attached to said body member such that said abrasive material covers a substantial portion of said first attachment surface and said second attachment surface.

18. The tubing/pipe cleaning device of claim 17 wherein said first and second attachment surfaces are constructed integral and define an angle of approximately eighty (80°) to one hundred (100°) degrees, wherein said angle allowing said first and second attachment surfaces in conjunction with said abrasive material to retain said tube or pipe once cut within the cleaning area.

19. The tubing/pipe cleaning device of claim 18 wherein the angle is approximately ninety (90°) degrees.

20. The tubing/pipe cleaning device of claim 17 wherein said first attachment surface having a first end and said second attachment surface having a first end and said first end of said first attachment surface and said first end of said second attachment surface abut to define an angle of approximately eighty (80°) to one hundred (100°) degrees, wherein said angle allowing said first and second attachment surfaces in conjunction with said abrasive material to retain said tube or pipe once cut within the cleaning area.

21. The tubing/pipe cleaning device of claim 20 wherein the angle is approximately ninety (90°) degrees.

22. The tubing/pipe cleaning device of claim 20 wherein the first end of said first attachment surface and the first end of said second attachment surface continuously abut each other along a length of the body member.

23. The tubing/pipe cleaning device of claim 17 wherein the attachment of said abrasive material to said body member defines two independent cleaning points.

24. A tubing/pipe cleaning device, said device attachable to a tubing/pipe cutter, said cutter having a cutting blade, said cutter defining a receiving area, said tubing/pipe cleaning device comprising:

a body member having a first attachment surface and a second attachment surface which form a substantially V-shaped cleaning area, said body member adapted for attachment to the tubing cutter within the receiving area of the cutter opposite the cutting blade of the cutter; and an abrasive material attached to said body member such that said abrasive material covers a substantial portion of said first attachment surface and said second attachment surface;

wherein said body member is pivotally attached to the tubing cutter from a tube/pipe receiving position to a tube/pipe cutting position.

25. The cleaning device of claim 1 wherein said body member protrudes beyond each side of the cutter when attached to the cutter.

* * * * *